United States Patent [19]
Ostrowski

[11] 3,933,324
[45] Jan. 20, 1976

[54] HELICOPTER WITH OPPOSITE ROTATING TORQUE CANCELLING HORIZONTAL PROPELLER

[76] Inventor: Stanislaw Ostrowski, Highway 40, Gusher, Utah 84030

[22] Filed: Aug. 2, 1974

[21] Appl. No.: 494,369

[52] U.S. Cl. ............. 244/17.23; 416/169; 416/129; 244/17.27
[51] Int. Cl.² ........................................ B64C 27/10
[58] Field of Search........... 244/17.11, 17.19, 17.21, 244/17.23, 17.25, 17.27; 416/169, 128, 129

[56] References Cited
UNITED STATES PATENTS

| | | | |
|---|---|---|---|
| 955,049 | 4/1910 | Brekke | 244/17.19 |
| 1,800,470 | 4/1931 | Oehmichen | 244/17.25 X |
| 2,170,733 | 8/1939 | Sharpe | 416/129 X |
| 2,192,300 | 3/1940 | Droitcour | 244/17.23 |
| 2,192,881 | 3/1940 | Bothezat | 244/17.23 X |
| 2,382,460 | 8/1945 | Young | 244/17.25 X |
| 2,672,115 | 3/1954 | Conover | 416/129 X |
| 2,838,123 | 6/1958 | Olcott | 244/17.19 |
| 3,018,984 | 1/1962 | Beau Rust | 244/17.19 |

Primary Examiner—Trygve M. Blix
Assistant Examiner—Galen L. Barefoot
Attorney, Agent, or Firm—Clarence A. O'Brien & Harvey B. Jacobson

[57] ABSTRACT

A helicopter having a small diameter and fast rotating upper horizontally disposed conventional airplane propeller and a large diameter slower and counterrotating large diameter bladed rotor equipped with variable pitch blades is provided and the bladed rotor is mounted in such a manner that its plane of rotation may be readily adjustably canted in all directions relative to the axis of rotation of the small diameter upper airplane-type propeller. Further, the blades of the rotor may be simultaneously adjusted in pitch and a single manually shiftable control is provided for selectively simultaneously or independently canting the plane of rotation of the rotor blades and varying the pitch of the rotor blades. Also, the helicopter is provided with a powered shaft for driving the small diameter upper airplane propeller and a drive connection including a high torque release and overrunning clutch drivingly couples the small diameter upper conventional airplane propeller to the lower large diameter and slower rotating bladed rotor.

7 Claims, 9 Drawing Figures

3,933,324

HELICOPTER WITH OPPOSITE ROTATING TORQUE CANCELLING HORIZONTAL PROPELLER

BACKGROUND OF THE INVENTION

Helicopters have been heretofore designed with counter-rotating coaxial rotors or propeller assemblies and some of these have included propeller or rotor assemblies of different diameters. Also, counter-rotating propellers have been heretofore provided on conventional propeller driven aircraft and directional controlling assemblies for helicopters have been provided whereby the plane in which the rotor of the helicopter swings may be canted in all directions relative to the vertical. Examples of these prior structures may be found in U.S. Pat. Nos. 1,381,939, 1,879,142, 2,037,745, 2,041,789, 2,185,545 and 3,554,467.

BRIEF DESCRIPTION OF THE INVENTION

The helicopter of the instant invention, however, utilizes not only counter-rotating coaxial upper and lower propeller assemblies, but includes an upper small diameter conventional airplane propeller rotating at high speed and a lower larger diameter bladed rotor including adjustable pitch blades rotating at a slower speed and driven at such slower speed through a gear reduction assembly from the upper airplane-type propeller. Further, the helicopter of the instant invention is constructed whereby the plane of rotation of the lower bladed rotor may be variably inclined in substantially all directions relative to the plane of rotation of the upper smaller diameter and faster rotating airplane-type propeller. Further, an adjustable control is provided whereby a single manually shiftable control may be utilized to variably cant the plane of rotation of the blades of the lower rotor while sumultaneously varying the pitch of the blades of the lower rotor.

The main object of this invention is to provide a helicopter assembly which will derive a major portion of its lift from a high speed horizontally disposed upper airplane-type propeller and which will obtain additional lift and directional stability from a counter-rotating and slower speed larger diameter bladed rotor disposed below the upper airplane-type propeller.

Another object of this invention, in accordance with the immediately preceding object, is to provide a helicopter construction in accordance with the preceding object including means whereby the plane through which the blades of the lower large diameter rotor swing may be variably canted relative to the plane in which the upper high speed airplane-type propeller rotates.

A still further object of this invention is to provide a drive connection between the high speed upper airplane-type propeller and the lower larger diameter bladed rotor whereby the latter will be driven at a slower speed from the former through a gear reduction assembly.

Another important object of this invention is to provide a drive connection in accordance with the immediately preceding object and including a high torque release and overrunning clutch whereby excessive resistance to rotation of the large diameter lower bladed rotor will cause deactivation of the drive connection between the upper airplane-type propeller and the lower bladed rotor and seizure of the power plant driving the upper airplane-type propeller will not cause the lower bladed rotor to terminate its rotation thereby allowing controlled descent of the helicopter as a result of freewheeling rotation of the bladed rotor in the event of power plant seizure.

A still further object of this invention is to provide a single control whereby the angulation of the plane in which the blades of the rotor rotate may be readily adjusted and the pitch of the blades of the rotor may be independently or simultaneously adjusted.

A final object of this invention to be specifically enumerated herein is to provide a helicopter construction which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
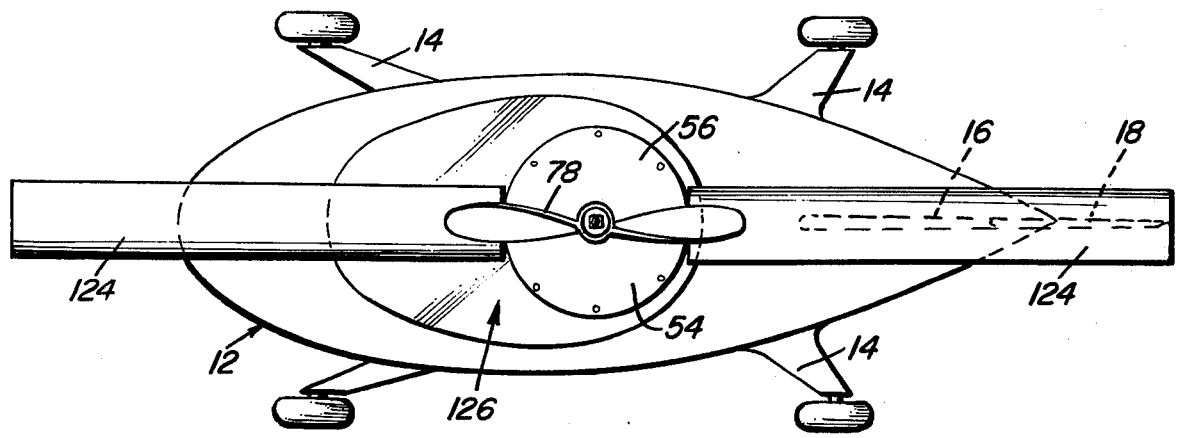
FIG. 1 is a fragmentary top plan view of a helicopter constructed in accordance with the present invention.
Figure 6:
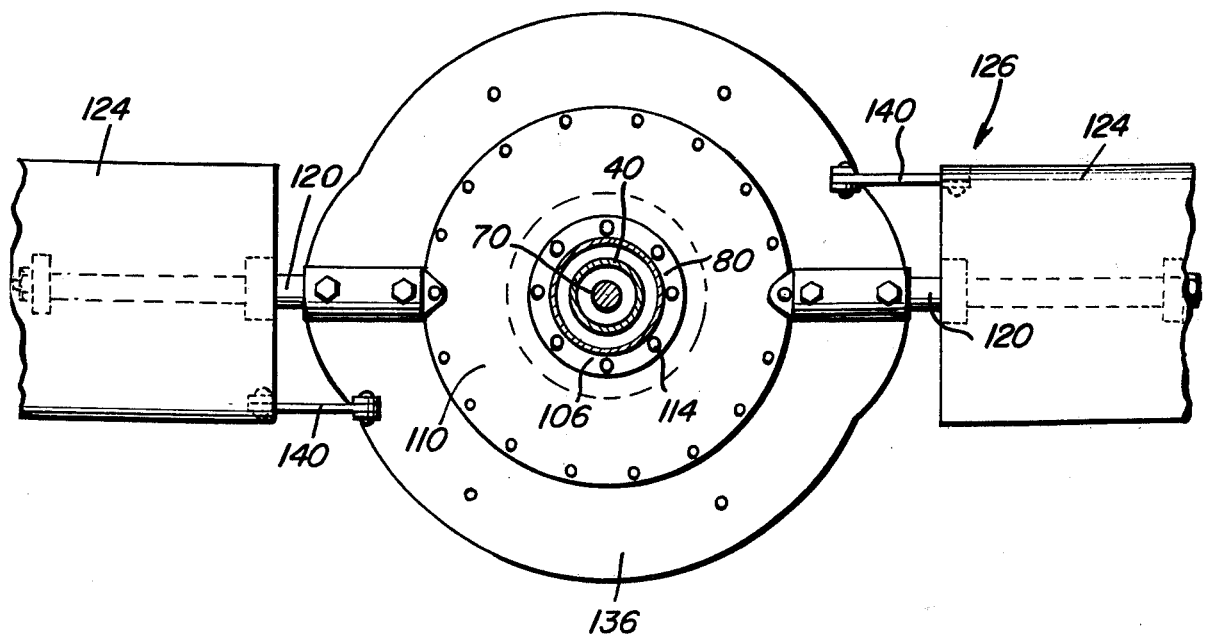
FIG. 6 is a horizontal sectional view taken substantially upon a plane indicated by the section line 6—6 of FIG. 3.
Figure 2:
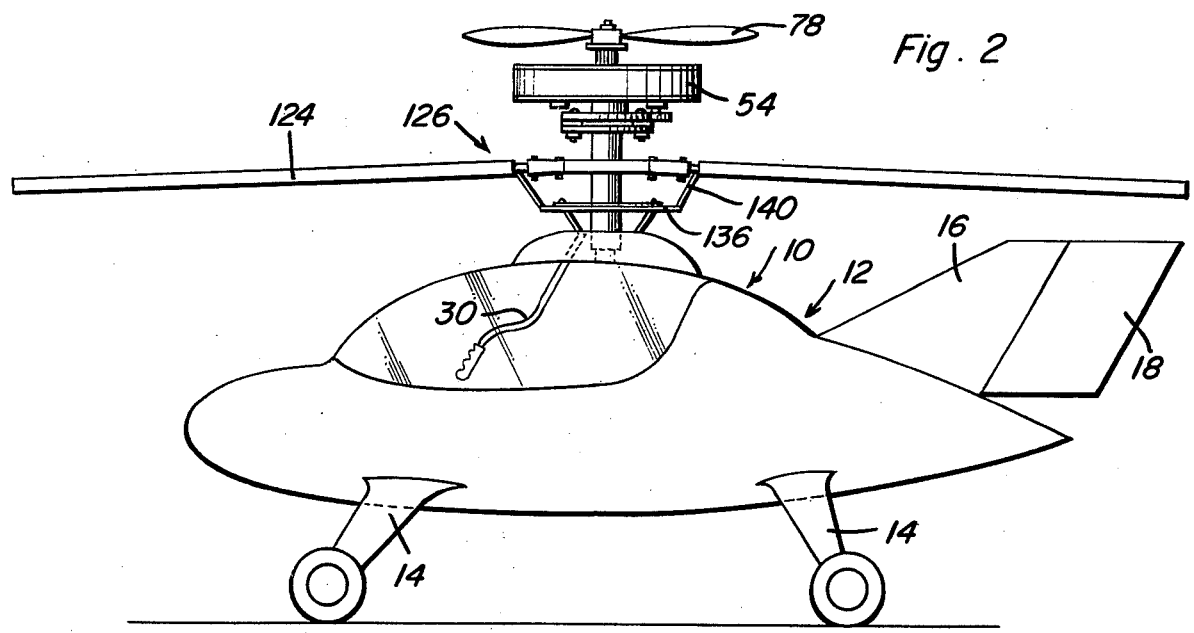
FIG. 2 is a side elevational view of the assemblage illustrated in FIG. 1.
Figure 3:
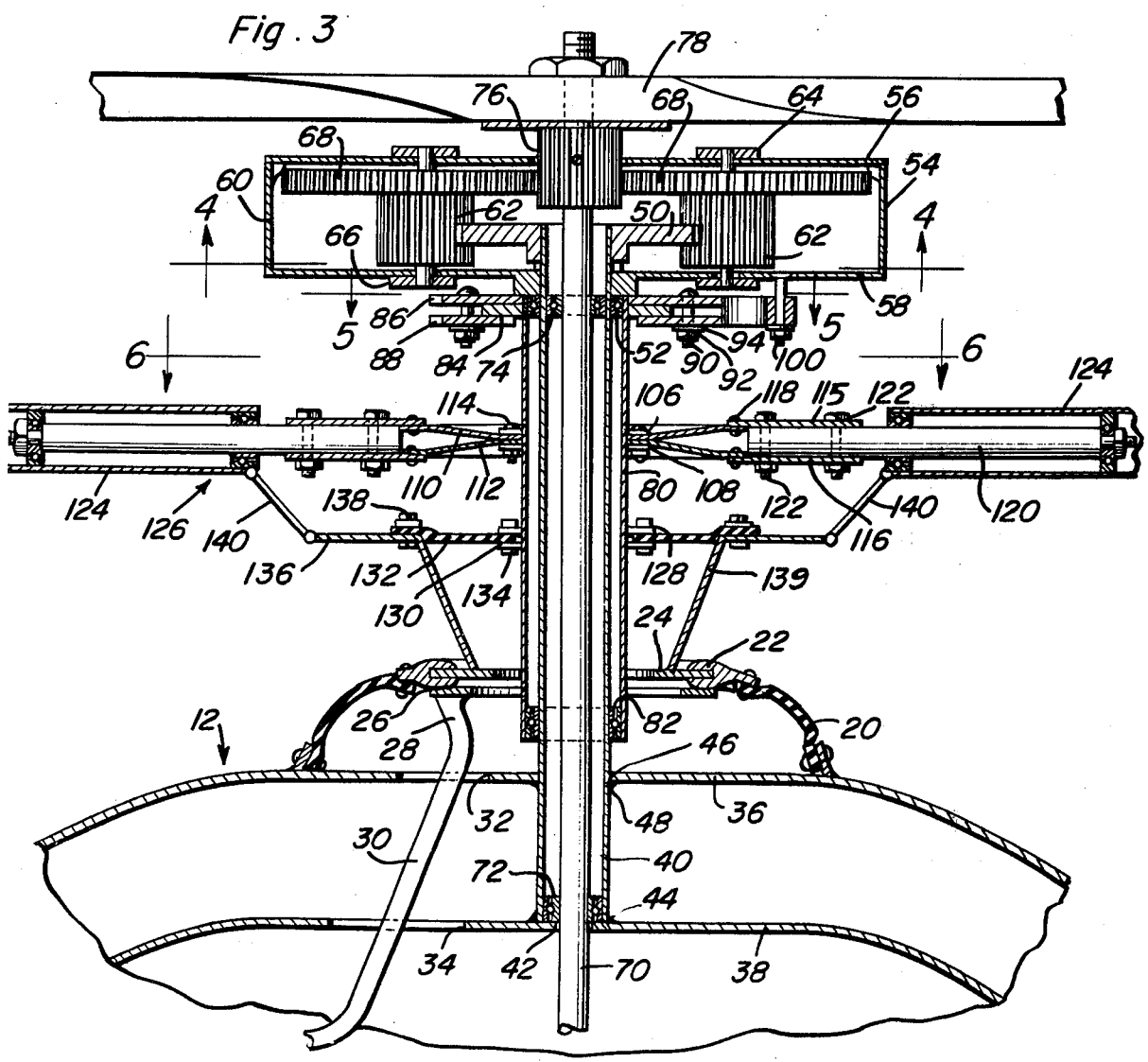
FIG. 3 is an enlarged fragmentary vertical sectional view taken substantially upon a plane passing longitudinally through the axes of rotation of the upper airplane-type propeller and the lower bladed rotor.
Figure 4:
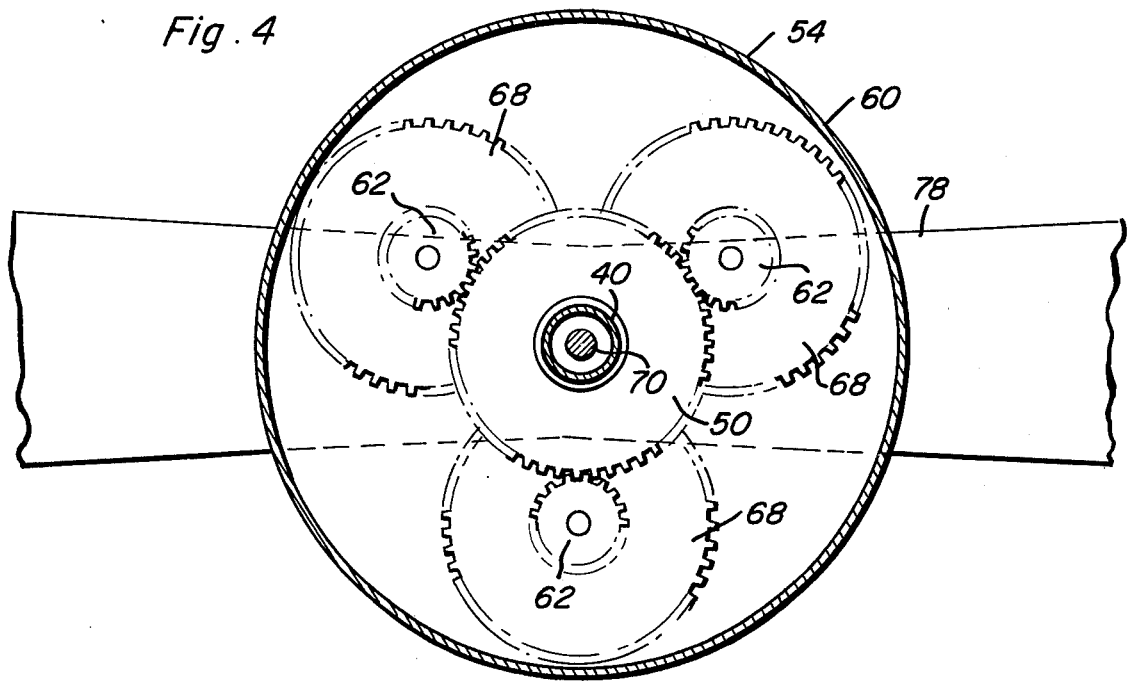
FIG. 4 is a horizontal sectional view taken substantially upon a plane indicated by the section line 4—4 of FIG. 3.
Figure 5:
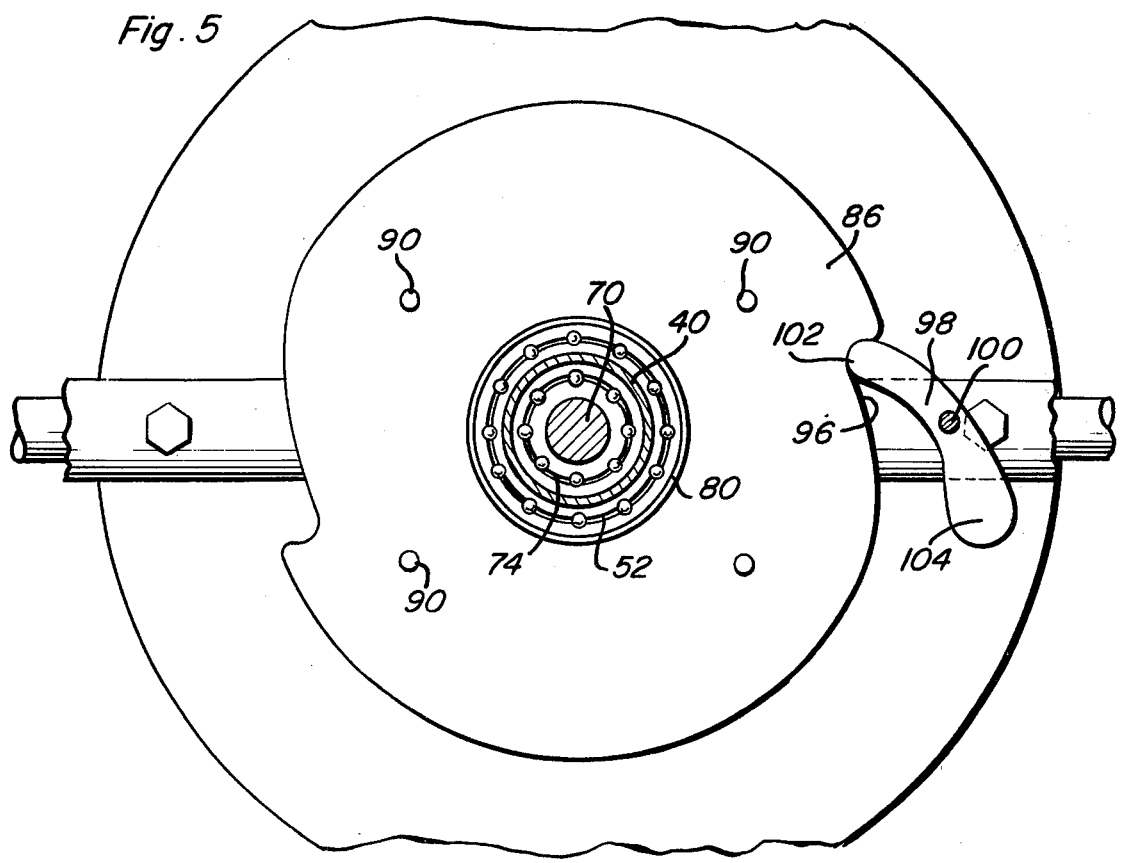
FIG. 5 is an enlarged horizontal sectional view taken substantially upon a plane indicated by the section line 5—5 of FIG. 3.
Figure 7:
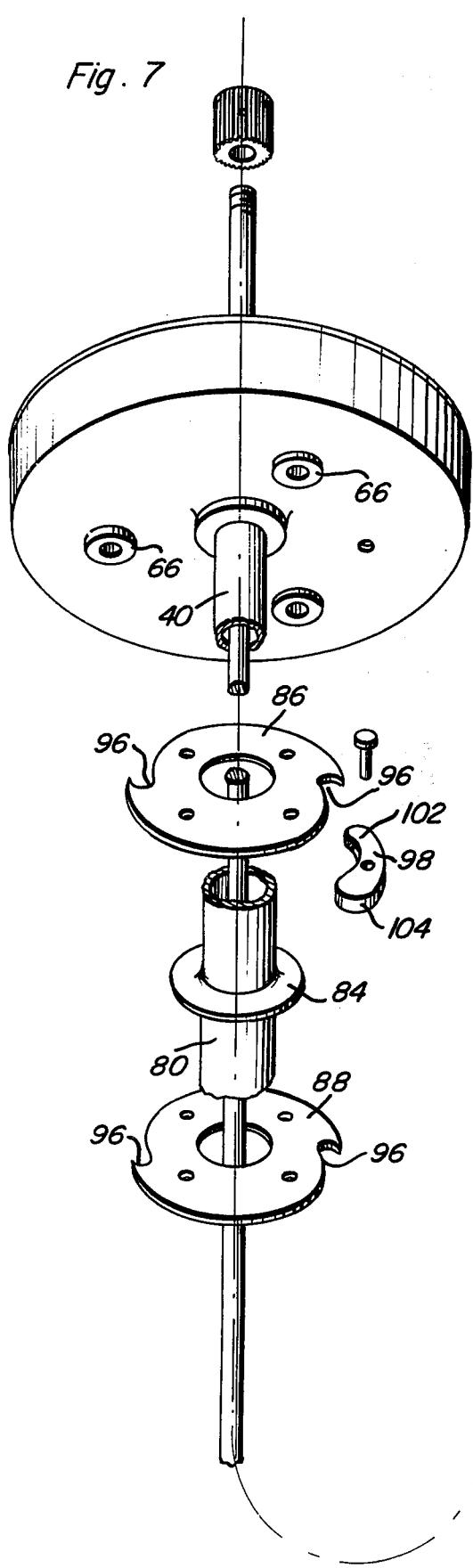
FIG. 7 is an exploded perspective view of portions of the drive assembly for the upper and lower propeller and rotor assemblies.

Referring now more specifically to the drawings, the numeral 10 generally designates the helicopter of the instant invention including an air frame referred to in general by the reference numeral 12 of any suitable construction. The air frame 12 includes suitable landing gear 14 and a vertical tail assembly 16 including a movable control member in the form of a rudder 18. Any suitable control (not shown) may be provided for the rudder 18.

The upper portion of the air frame 12 includes a convex support and thrust member 20 constructed of stiff supportive but flexible material defining an annular central thrust and journal bearing structure 22 in which an annular support plate 24 is journaled. A rigid annular ring 26 is mounted in any convenient manner to the underside of the annular thrust and journal bearing structure 22 and the upper root end 28 of a downwardly projecting control handle 30 is rigidly secured to the ring 26, the lower portion of the control handle 30 projecting downward through suitable openings 32 and 34 formed in the air frame structure 12.

The air frame structure includes vertically spaced upper and lower portions 36 and 38 in the upper portion thereof in which the openings 32 and 34 are formed and the lower end of a main support sleeve 40 is secured to the lower portion 38 about a vertical opening 42 formed in the lower portion 38 immediately aft of the opening 34. The sleeve is secured to the lower portion 38 in any convenient manner such as by welding 44 and the sleeve 40 projects upwarldy through an opening 46 formed in the upper portion 36 and is suitably anchored to the upper portion 36 in any convenient manner such as by welding 48. The support sleeve 40 projects upwardly through the support plate 24 and has a gear wheel 50 fixedly mounted on its upper end. An outer combined thrust and journal bearing 52 is mounted on the upper end of the sleeve 40 below the gear wheel 50 and a horizontally disposed circular housing 54 including circular upper and lower walls 56 and 58 interconnected by means of a cylindrical peripheral wall 60 is journaled from the bearing 52. Three planet gears 62 are journaled from the upper and lower walls 56 and 58 of the housing 54 by means of upper and lower bearing assemblies 64 and 66 and the planet gears 62 are meshed with the stationary gear 50.

The upper ends of the planet gears 62 include diametrically enlarged gear portions 68 and a drive shaft 70 driven by suitable motor means (not shown) housed within the air frame 12 projects upwardly through the opening 42 and through the support sleeve 40. The drive shaft 70 is journaled from the lower end of the support sleeve 40 by means of a bearing 72 and the upper end of the drive shaft 70 is journaled by means of a second internal bearing 74 carried by the upper end of the support sleeve 40.

The upper end of the drive shaft 70 has a gear wheel 76 mounted thereon with which each of the diametrically enlarged gear portions 68 is meshed and the shaft 70 projects above the gear or gear wheel 76 and has a conventional airplane type small diameter propeller 78 mounted thereon.

An outer sleeve 80 is journaled from the support sleeve 40 by means of the bearing assembly 52 and a second bearing assembly 82 and a collar disc 84 is fixedly mounted on the upper end portion of the sleeve 80 and sandwiched between a pair of upper and lower clutch discs 86 and 88 secured together by means of peripherally spaced bolts 90 secured therethrough by means of fasteners 92 and including spring-type washers 94. The discs 86 and 88 are provided with registered diametrically opposite ratchet notches 96 and a dog lever 98 is oscillatably supported intermediate its opposite ends to the underside of the housing 54 by means of a pivot fastener 100 secured through the bottom wall 58 of the housing 54. The ratchet lever 98 includes a first end portion 102 which may be engaged with either pair of registered notches 96 and a second weighted end portion 104. Upon rapid rotation of the housing 54 the centrifugal force acting upon the weighted end portion 104 insures that the first end portion 102 will be seated in a pair of registered notches 96 and thereby drivingly coupling the housing 54 to the sleeve 80.

An upper mid-portion of the sleeve or hub 80 includes a pair of vertically spaced mounting collars 106 and 108 between which the inner peripheral portions of flexible annular diaphragms 110 and 112 are secured by means of circumferentially spaced bolts 114 secured through the collars 106 and 108 and the diaphragms 110 and 112. The outer peripheral portions of the diaphragms 110 and 112 are secured to the inner peripheral portions of rigid mounting discs 115 and 116 which are also annular in configuration and the diaphragms 110 and 112 are secured to the discs 115 and 116 by means of suitable fasteners 118.

Diametrically opposite pairs of portions of the discs 115 and 116 have radially outwardly projecting mounting shaft portions 120 mounted therebetween by means of fasteners 122 and each of the mounting shaft portions 120 oscillatably supports the inner end of one of the blades 124 of the rotor assembly referred to in general by the reference numeral 126.

Carried by a lower mid-portion of the outer sleeve 80 is a second pair of axially spaced annular collars 128 and 130 between which the inner peripheral portion of a flexible disc 132 is secured by means of suitable fasteners 134. The outer peripheral portion of the flexible disc 132 is secured to the inner peripheral portion of a larger diameter mounting disc 136 by means of suitable fasteners 138 and a plurality of periperally spaced upwardly and outwardly divergent braces 139 are secured between the inner periphery of the disc 136 and the support ring 24 disposed therebelow to which the root end 28 of the control handle 30 is secured through the medium of ring 26. Still further, diametrically opposite portions of the disc 136 have the lower ends of upwardly and outwardly divergent connecting links 140 pivotally secured thereto and the upper ends of the connecting links 140 are pivotally connected to outer peripheral portions of the root ends of the blades 124 whereby up and down movement of the disc 136 will cause the pitch of the blades 124 to be varied.

Figure 8:
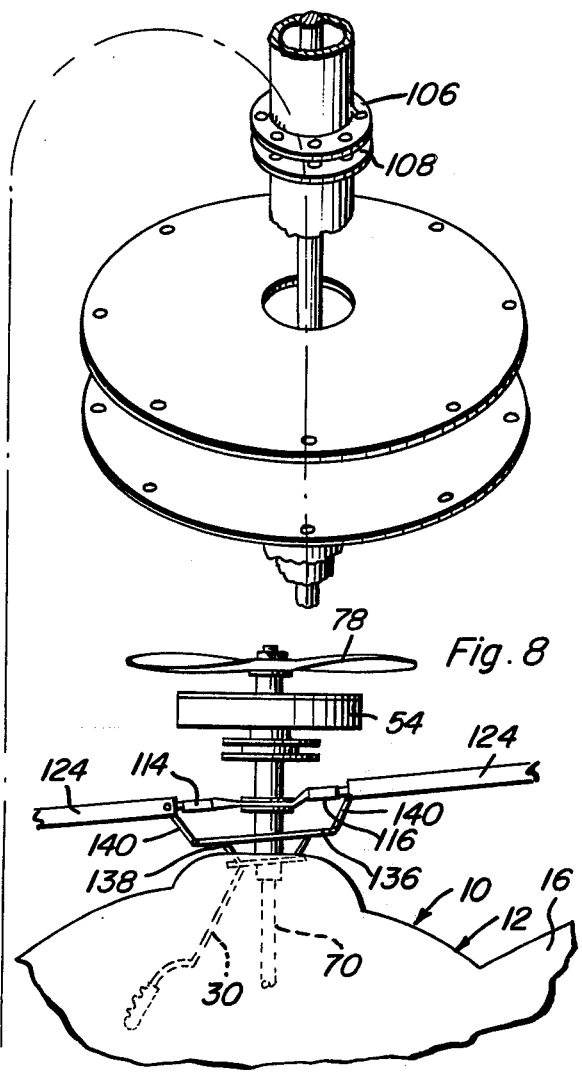
FIGS. 8 and 9 are fragmentary side elevational views illustrating the manner in which the plane through which the blades of the rotor assembly swing may be variably inclined.
Figure 9:
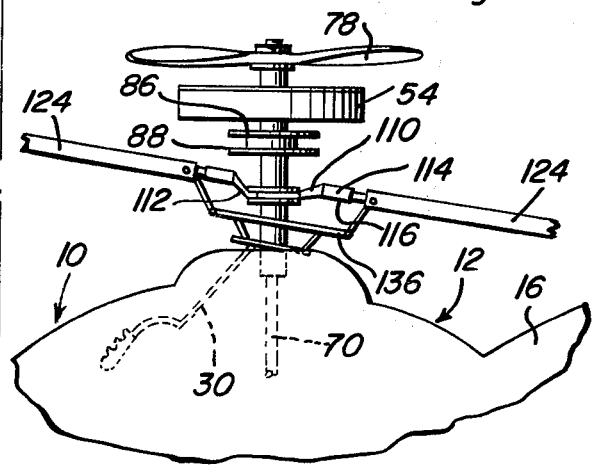

From the foregoing it will be appreciated that the ratchet lever or dog 98 drivingly couples the housing 54 to the clutch discs 86 and 88 for rotating the sleeve 80 at the same speed of rotation as the housing 54. Thus, the rotor assembly 126 rotates at the same speed as the housing 54. Further, the housing 54 is caused to rotate by the gear train consisting of the gear wheel 76, the gear portions 68, the gear 50 and the gears 62 in a direction opposite to direction of rotation of the drive shaft 70 and conventional aircraft-type propeller 78. The gear train defines a gear reduction assembly driving the housing 54 at approximately one-tenth the speed of rotation of the drive shaft 70. However, it is to be noted that the gear ratio of the gear train will be determined by the pitch and diameter of the conventional airplane-type propeller 78 in relation to the diameter of the rotor 126 in order that the counter-rotating assemblies 78 and 126 will require substantially the same torque at operating speeds thus eliminating any torsional forces on the air frame tending to rotate the latter in either direction about the axis of rotation of the drive shaft 70. During forward flight the rudder 18 may be utilized to trim the helicopter 10 and it may be seen from FIGS. 8 and 9 of the drawings that rearward displacement of the lower end of the control handle 30 will cause the plane through which the blades 124 of the rotor assembly 126 swing to be forwardly and downwardly tilted for forward flight while forward displacement of the lower end of the control handle 30 will cause the plane in which the blades 124 swing to be rearwardly and downwardly canted for rearward flight. Of course, the lower end of the control handle 30 may be displaced in all horizontal directions so as to variably incline or cant the plane through which the blades 124 of the rotor assembly 126 swing in all directions.

However, it will be noted that the plane of rotation of the airplane-type propeller 78 remains stationary relative to the air frame and it is to be further appreciated that an upward or downward thrust on the control handle 30 will cause the pitch of the blades 124 of the rotor assembly 126 to be varied.

Inasmuch as the driving connection between the housing 54 and the sleeve 80 defined by the ratchet lever 98, the discs 86 and 88 and the disc or collar 84 comprises a slip-type connection, in the event excessive resistance to rotation of the rotor assembly 126 is encountered the drive shaft 70 and propeller 78 may continue to rotate at substantially the same speed. Further, in the event of seizure of the power plant drivingly coupled to the drive shaft 70, the ratchet lever 98 and discs 86 and 88 define an overrunning clutch whereby the rotor assembly 126 is capable of free-wheeling in advance of the drive shaft 70. Accordingly, if engine failure is encountered the helicopter 10 may still be operated to produce a controlled descent by controlling the pitch of the blades 124 during free rotation of the rotor assembly 126.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A helicopter including an air frame, vertically spaced and horizontally disposed small and large diameter propeller and bladed rotor assemblies, respectively, journaled from said air frame, powered drive shaft means drivingly coupled to said assemblies, said small diameter propeller being journaled from said air frame for rotation about an upstanding axis, said bladed rotor assembly including generally radial blades anchored at their radial inner ends to a hub journaled from said air frame coaxial with the axis of rotation of said propeller, said hub including flexive portions enabling vertical swinging of the outer end portions of said blades, a mounting member supported from said frame for rotation about said axis and for universal canting in all directions relative to a plane normal to said axis, and connecting means spaced about said axis interconnecting said mounting member and said blades at points on the latter spaced outwardly from said flexive portions, whereby canting said mounting member will cause the plane in which the outer end portions of said blades disposed outwardly of said flexive portions rotate to be similarly canted relative to the plane in which the propeller rotates.

2. The combination of claim 1 wherein said drive assembly includes a slip clutch whereby excessive resistance to rotation of said bladed rotor assembly will allow said drive shaft and thus said propeller assembly to rotate in advance of said rotor assembly.

3. The combination of claim 1 wherein said drive assembly includes a clutch allowing free rotation of said bladed rotor assembly in advance of rotation of said drive shaft and propeller assembly.

4. The combination of claim 3 wherein said drive assembly includes a slip clutch whereby excessive resistance to rotation of said bladed rotor assembly will allow said drive shaft and thus said propeller assembly to rotate in advance of said rotor assembly.

5. The combination of claim 1 including means supporting the outer end portions of said blades from intermediate portions thereof anchored to said flexive portions for oscillation of said outer end portions relative to said intermediate portions about axes generally paralleling said blades.

6. The combination of claim 5 including a single shiftable control member operatively connected to said outer end portions of said blades for simultaneously angularly adjusting said outer end portions about their axes of oscillation.

7. The combination of claim 6 wherein said single shiftable control member is also operatively connected to said mounting member for canting the latter relative to the plane in which said rotor outer end portions swing independently of as well as simultaneously with adjustment of said outer end portions about their axes of oscillation.

* * * * *